(12) United States Patent
Mizuno et al.

(10) Patent No.: US 6,443,678 B2
(45) Date of Patent: Sep. 3, 2002

(54) GROMMET FOR PREVENTING WATER PENETRATION

(75) Inventors: Hiromichi Mizuno; Hisashi Ito, both of Aichi (JP)

(73) Assignee: Aoyama Seisakusho Co., Ltd., Nagoya (JP)

(*) Notice: Subject to any disclaimer, the term of this patent is extended or adjusted under 35 U.S.C. 154(b) by 0 days.

(21) Appl. No.: 09/729,591

(22) Filed: Dec. 4, 2000

(30) Foreign Application Priority Data

Dec. 8, 1999 (JP) .............................. 11-349028

(51) Int. Cl.$^7$ ................................ F16B 37/04
(52) U.S. Cl. ..................... 411/182; 411/371.1
(58) Field of Search .................. 411/182, 371.1, 411/372.2, 508, 913; 24/297

(56) References Cited

U.S. PATENT DOCUMENTS

| | | | | |
|---|---|---|---|---|
| 3,313,083 A | * | 4/1967 | Flora | |
| 3,534,797 A | * | 10/1970 | Reinhard | |
| 4,601,621 A | * | 7/1986 | Permoda | |
| 5,217,337 A | * | 6/1993 | Junemann | |
| 5,540,528 A | * | 7/1996 | Schmidt | |
| 6,213,700 B1 | * | 4/2001 | Everard | |

* cited by examiner

*Primary Examiner*—Flemming Saether
(74) *Attorney, Agent, or Firm*—Frishauf, Holtz, Goodman & Chick, P.C.

(57) ABSTRACT

A synthetic resin grommet is provided which has a substantially cylindrical body having a flange portion and a head portion. The flange portion has an inverted dish-like shape and includes an elastically deformable vane-like shaped rim portion. Stopping claws are arranged on an outer circumference of the cylindrical body such that tips of the claws face the flange portion, and an elastically compressible annular rib is formed on top of the head portion of the cylindrical body. An upper portion of the head portion has a tapered face, and the annular rib is formed above the tapered face. With this structure, an inexpensive synthetic resin grommet is provided which exhibits sealing facility when it is fitted to a body of a car or a home electric appliance and when a part is attached thereto through the grommet, and which accurately and securely prevents the entrance of water into the body without requiring intricate procedures such a fitting of a sealing annulus.

3 Claims, 2 Drawing Sheets

GROMMET FOR PREVENTING WATER PENETRATION

BACKGROUND OF THE INVENTION

The present invention relates to a synthetic resin grommet used, for example, when parts for an automobile or parts for a home electric appliance (hereinafter simply referred to as parts) are attached to a body of the car or of the appliance (hereinafter simply referred to as body), respectively.

A synthetic resin grommet as shown in FIG. 4 is widely used for attaching parts to the body 26 using bolts. The grommet has a cylindrical body 21, a flange portion 22 arranged at a predetermined position of the cylindrical body 21 and stopping claws 24 whose tips face the flange portion. However, the conventional grommet has no sealing mechanism between a bearing face 25a of a tapping screw 25 to be inserted to the cavity of the grommet to fasten it and a head portion 23 of the grommet to be come into contact with the bearing face 25a when the tapping screw is fully fastened, nor between the lower surface of the flange portion 22 and the tips of the stopping claws 24, so that it is in danger of entrance of water into the grommet and/or body through these portions. Therefore, entrance of water has been prevented by applying a grommet whose cylindrical body has a closed bottom 28 to the body 26 and by fitting a sealing annulus 27 such as of sponge rubber between the upper surface of the body 26 and the lower surface of the flange portion 22 when the grommet is applied to the body. However, the above contrivances still involve problems that to fit the sealing annulus 27 imposes an extra operation on an operator, and to form a grommet having a main body with a closed bottom impairs moldability of the grommet, preventing providing of grommets inexpensively.

SUMMARY OF THE INVENTION

The present invention is directed to solving the problems inherent in the prior art by contriving the configuration of the grommet and providing an inexpensive synthetic resin grommet which can prevent accurately and securely entrance of water into the grommet and/or body with no extra imposition on an operator.

More specifically, the synthetic resin grommet according to the present invention has a flange portion formed at a predetermined position of a cylindrical body and stopping claws arranged on the outer circumference of the cylindrical body such that their tips face the flange portion, characterized in that the grommet has an annular rib arranged at a top of a head portion of the cylindrical body. Further, the rim portion of the flange portion is preferably formed to have a thin vane-like shape, because sealing between the body and the flange portion can be achieved more accurately and securely. Here, the cylindrical body is preferably designed to have an open bottom, because this improves moldability of the grommet.

Other aspects and advantages of the invention will become apparent from the following description, taken in conjunction with the accompanying drawings illustrated by way of examples the principles of the invention.

BRIEF DESCRIPTION OF THE DRAWINGS

The invention together with the objects and advantages thereof, may best be understood by reference to the following description of the presently preferred embodiments together with the accompanying drawings in which.

DESCRIPTION OF THE PREFERRED EMBODIMENTS

Figure 1:
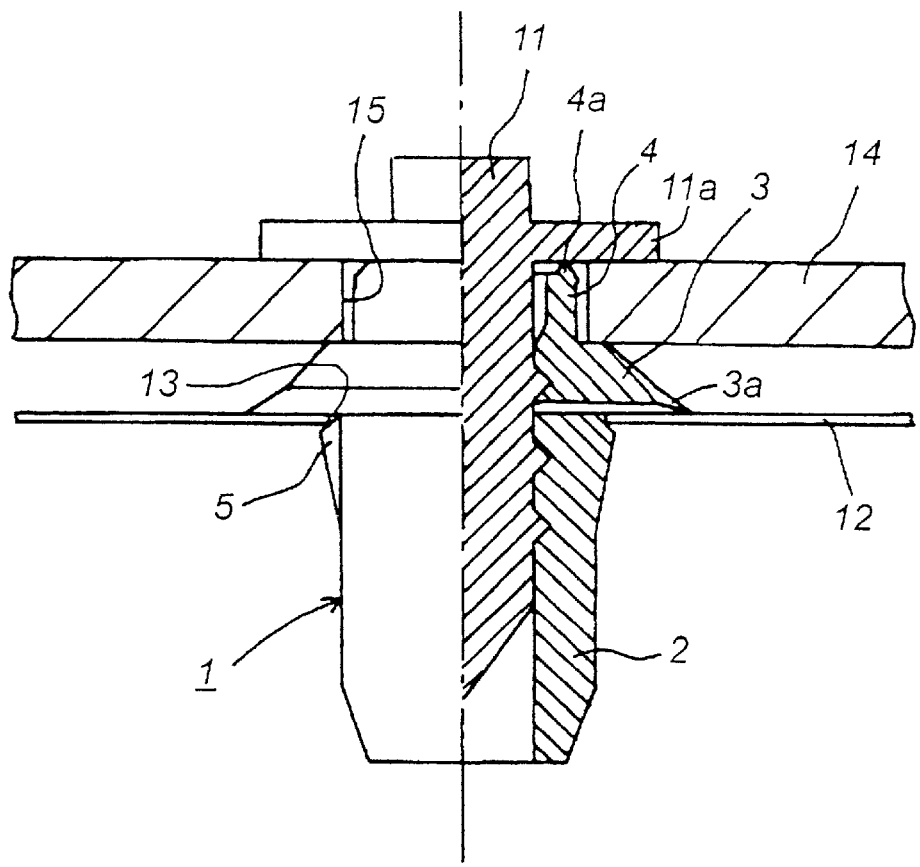
FIG. 1 is a partially cutaway front view showing the grommet according to one embodiment of the present invention attached to a body.
Figure 2:
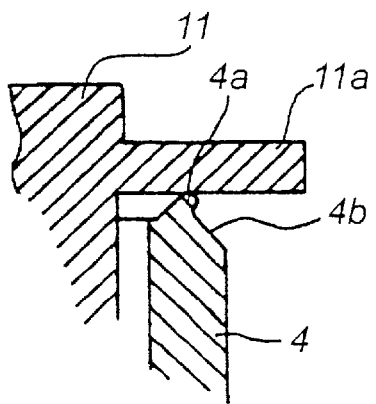
FIG. 2 is an enlarged explanatory view showing a major part (the head portion of the cylindrical body) in the embodiment shown in FIG. 1.
Figure 3:
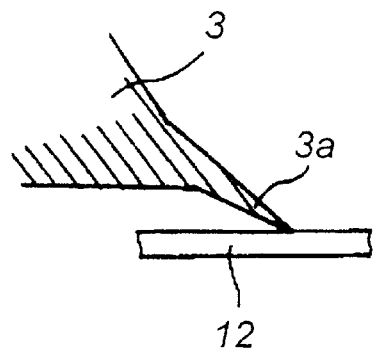
FIG. 3 is an enlarged explanatory view showing another major part (the rim portion of the flange portion) in the embodiment shown in FIG. 1.
Figure 4:
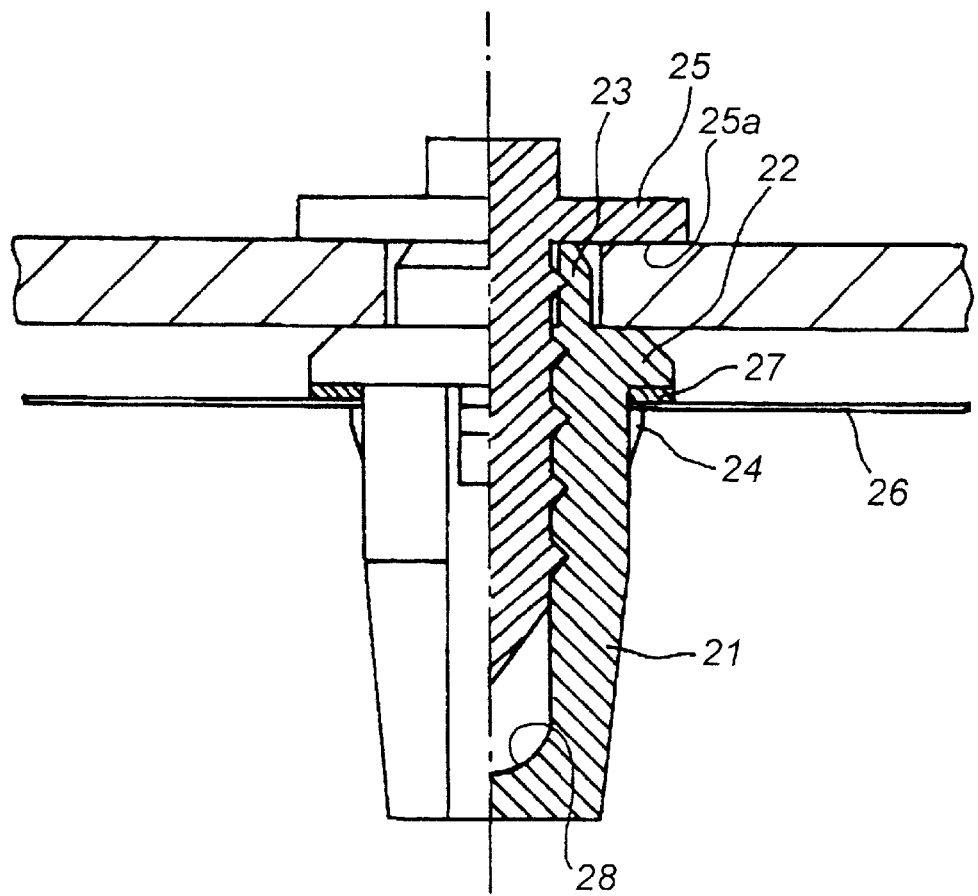
FIG. 4 is a partially cutaway front view showing a typical example of the conventional grommet attached to a body.

Next, one embodiment of the present invention will be described specifically referring to the attached drawings.

In the drawings, the reference number 1 represents a single-piece grommet formed by using a synthetic resin (such as polyamide, polyacetal, polypropylene, polyethylene, urethane series elastomer and polyester series elastomer, preferably polyamide, because of its appropriate strength and appropriate tensile elongation). The grommet 1 has, at a predetermined position on its cylindrical body 2, a flange portion 3. The cylindrical body 2 has on the outer circumference thereof stopping claws 5 whose tips face the flange portion 3.

The flange portion 3 has an inverted dish-like shape as a whole and has a vane-like rim portion 3a which is as thin as can be deformed elastically when tightened with a bolt or tapping screw 11 (hereinafter description is made by means of tapping screw according to the prior art) such that the edge of the rim portion 3a is brought into intimate contact with the upper surface of the body 12. This ensures sealing between the body and the flange portion without interposing afterward a sealing annulus such as of sponge rubber between the flange portion and the body, so that there occurs no entrance of water into the body. Further, the cylindrical body 2 has at the tip of the head portion 4 an annular rib 4a. Here, this annular rib 4a is preferably designed to have a configuration such that it can easily be compressed when fastened with a tapping screw 11, that is to say, the annular rib 4 can be deformed elastically to be brought into intimate contact with the lower surface of the collar-like portion 11a of the tapping screw 11. The annular rib 4a is preferably designed to have a large diameter at the top compared with the bottom thereof. While it is essential that this annular rib 4a is present at least at the top of the head portion 4, the outer the position of the rib 4a, the better. Particularly preferably, the outer circumference of the top of the head portion 4 is formed to have a tapered cross section, and the annular rib 4a is formed at a position on and adjacent to the top of the tapered face 4b, because this tapered face 4b facilitates outward elastic deformation of the annular rib 4a.

Concerning to the position of the annular rib 4a in terms of sealing effect, the annular rib 4a can be arranged on the lower surface of the collar-like portion 11a of the tapping screw 11 at a position opposing the top of the head portion. In this case, the head portion is allowed to have a flat top. Meanwhile, if the grommet and the tapping screw are formed using materials having different hardness, and an annular rib having an acute cross section is formed on the harder member of the two, this constitution can also exhibit a satisfactory sealing effect.

Here, while the object of preventing water from entering the body can be attained so long as an annular rib 4a, for example the annular rib having an inverted V-shaped cross section, is arranged at the top of the head portion 4 and, as necessary, the rim portion 3a of the flange portion 3 is formed to have a thin vane-like shape no matter whether the cylindrical body 2 has a closed bottom or an open bottom. However, the cylindrical body 2 having an open bottom is preferred, since it leads to saving of material costs, facilitates fabrication of molds and improves moldability, realizing mass production of high-quality products inexpensively.

The grommet 1 having the constitution described above is attached to a body 12 by inserting the cylindrical body 2 to a grommet insertion hole 13 defined in the body 12 such that the bearing face of the flange portion 3 is abutted against the upper surface of the body 12 under the stopping effect to be exerted by the stopping claws 5 arranged on the cylindrical body 2 at predetermined positions such that their tips face the flange portion (here passing of the cylindrical body 2 through the grommet insertion hole 13 is achieved with the aid of elastic deformation of the grommet insertion hole 13). Then, a part 14 is fitted in the head portion 4 through a fitting hole defined in the part 14. If a tapping screw 11 is screwed from the head portion 4 into the cavity of the cylindrical body 2, the part 14 can be attached accurately and securely to the body 12 through the collar portion 11a of the tapping screw 11 and the grommet (more accurately, through a step formed on the upper surface of the flange portion 3 of the grommet 1). The insertion of the tapping screw 11 into the grommet 1 and fastening of the grommet therewith cause the annular rib 4a to undergo elastic deformation and achieve sealing between the bearing face of the tapping screw 11 (more accurately, the lower surface of the collar portion 11a; the same shall apply hereinafter) and the head portion 4 to be abutted against the bearing face, thus preventing accurately and securely rainwater and the like from entering the cavity of the grommet 1 through the gap present between the bearing face of the tapping screw 11 and the part 14. Simultaneously, the vane-like rim portion 3a formed on the flange portion 3 of the grommet 1 also undergoes elastic deformation to be brought into intimate contact with the body 12 (more accurately with the upper surface of the body 12) and exhibit excellent sealing effect, so that this also ensures accurate and secured sealing between the body 12 and the flange portion 3. For example, even if rainwater or the like enters from the gap present between the bearing face of the tapping screw 11 and the part 14 and through the fitting hole 15 of the part 14 into the clearance present between the part 14 and the body 12, the grommet 1 can prevent accurately and securely the rainwater or the like from entering the inner space of the body 12 any further.

As is clear from the above description, according to the grommet of the present invention, sealing can be achieved accurately and securely between the bearing face of the tapping screw 11 screwed into the cavity of the grommet 1 to fasten it and the head portion 4 of the grommet 1 to be abutted against it by merely forming an annular rib 4a at the top of the head portion 4. If the flange portion 3 is allowed to have a thin vane-like rim portion 3a, sealing between the body 12 and the flange portion 3 can also be achieved accurately and securely. According to this constitution, favorable effects can be expected further (including omission of the sealing annulus and the operation of fitting it). In addition, if the cylindrical body 2 is allowed to have an open bottom, it leads to saving of material costs by just that much, facilitates fabrication of molds and improves moldability of the grommet 1, realizing mass production of high-quality products more inexpensively.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A synthetic resin grommet comprising:
    a substantially cylindrical body comprising a flange portion and a head portion, said flange portion having an inverted dish-like shape and comprising an elastically deformable vane-like shaped rim portion;
    stopping claws arranged on an outer circumference of the cylindrical body such that tips of the claws face the flange portion; and
    an elastically compressible annular rib formed on top of the head portion of the cylindrical body;
    wherein an upper portion of the head portion comprises a tapered face, and said annular rib is formed above said tapered face
    wherein said tapered face is formed along an outer surface of the upper portion of the head portion, and said annular rib is formed at a position on and adjacent to a top of said tapered face.

2. The grommet according to claim 1, wherein the cylindrical body has an open bottom.

3. The grommet according to claim 1, wherein a step is formed on an upper surface of the flange portion.

* * * * *